United States Patent
Dixon et al.

(10) Patent No.: US 10,648,749 B2
(45) Date of Patent: May 12, 2020

(54) FLUID SYSTEM COMPONENTS WITH THERMAL CONDITIONING PASSAGES

(71) Applicant: Swagelok Company, Solon, OH (US)

(72) Inventors: Matthew R. Dixon, Parma, OH (US); Karim Mahraz, Willoughby, OH (US); Bryan S. Reiger, Willowick, OH (US); Robert Bianco, Columbia Station, OH (US); Jeremy Elek, Chagrin Falls, OH (US); Andrew P. Marshall, University Heights, OH (US)

(73) Assignee: SWAGELOK COMPANY, Solon, OH (US)

( * ) Notice: Subject to any disclaimer, the term of this patent is extended or adjusted under 35 U.S.C. 154(b) by 155 days.

(21) Appl. No.: 15/910,143

(22) Filed: Mar. 2, 2018

(65) Prior Publication Data

US 2018/0259270 A1 Sep. 13, 2018

Related U.S. Application Data

(60) Provisional application No. 62/466,757, filed on Mar. 3, 2017.

(51) Int. Cl.
*F16K 49/00* (2006.01)
*F28F 13/08* (2006.01)
(Continued)

(52) U.S. Cl.
CPC .............. *F28F 13/08* (2013.01); *B33Y 80/00* (2014.12); *F16K 49/005* (2013.01); *F28D 7/005* (2013.01); *F28F 7/02* (2013.01); *Y10T 137/6579* (2015.04)

(58) Field of Classification Search
CPC ................ F16K 49/005; F16K 49/007; Y10T 137/6579; F28F 7/02; F28F 13/08; F28D 7/005; B33Y 80/00
(Continued)

(56) References Cited

U.S. PATENT DOCUMENTS

| X566592 | 8/1896 | Long |
|---|---|---|
| X772007 | 10/1904 | Theis |

(Continued)

FOREIGN PATENT DOCUMENTS

| CN | 104677688 | 6/2015 |
|---|---|---|
| CN | 204479342 | 7/2015 |

(Continued)

OTHER PUBLICATIONS

International Search Report and Written Opinion from PCT/US2018/020572 dated Jun. 8, 2018.

*Primary Examiner* — Kevin F Murphy
*Assistant Examiner* — Jonathan J Waddy
(74) *Attorney, Agent, or Firm* — Calfee, Halter & Griswold LLP

(57) ABSTRACT

A flow control device includes a body having an upper portion defining a flow passage extending axially along a primary axis between a first end port and a second end port, the flow passage defining a central cavity between the first and second end ports, and a lower portion defining an axially extending thermal conditioning inlet port and an axially extending thermal conditioning outlet port. A flow control element is disposed in the central cavity and movable to control fluid flow between the first end port and the second end port. The body further includes a thermal conditioning passage having a first vertical portion extending from the thermal conditioning inlet port into the upper portion of the body, a circumferential portion extending from the first vertical portion circumferentially around at least a portion of the flow passage, and a second vertical portion extending vertically from the circumferential portion to the thermal conditioning outlet port.

14 Claims, 11 Drawing Sheets

(51) Int. Cl.
*B33Y 80/00* (2015.01)
*F28D 7/00* (2006.01)
*F28F 7/02* (2006.01)

(58) Field of Classification Search
USPC .......................................................... 137/340
See application file for complete search history.

(56) References Cited

U.S. PATENT DOCUMENTS

| | | | |
|---|---|---|---|
| 2,591,429 A | 4/1952 | Harrower | |
| 2,594,762 A | 4/1952 | Freund et al. | |
| 2,725,221 A | 11/1955 | Pontow | |
| 2,871,881 A | 2/1959 | Hewson | |
| 3,098,497 A | 7/1963 | Glasgow et al. | |
| 3,266,517 A * | 8/1966 | Carr .................. | C21B 9/12 137/340 |
| 3,636,972 A | 1/1972 | Scaramucci | |
| 3,770,005 A | 11/1973 | Bradenburg | |
| 3,901,269 A * | 8/1975 | Henderson ............ | F16K 49/005 137/340 |
| 3,973,585 A | 8/1976 | Henderson | |
| 5,368,063 A | 11/1994 | Kida et al. | |
| 6,116,267 A | 9/2000 | Suzuki et al. | |
| 6,427,717 B1 | 8/2002 | Kimura | |
| 7,527,068 B2 | 5/2009 | Jansen | |
| 7,874,310 B1 | 1/2011 | Jansen | |
| 8,607,812 B2 | 12/2013 | Steele | |
| 9,133,961 B2 | 9/2015 | Farinone | |
| 2002/0152988 A1* | 10/2002 | Michels .................. | F02D 9/10 123/337 |
| 2011/0140023 A1 | 6/2011 | Sauer et al. | |
| 2012/0167862 A1 | 7/2012 | Nishimori et al. | |
| 2015/0361847 A1 | 12/2015 | Fahrenkrug et al. | |
| 2016/0076816 A1 | 3/2016 | Deegan | |
| 2016/0102798 A1 | 4/2016 | Shin | |
| 2016/0303656 A1 | 10/2016 | Lacy et al. | |
| 2016/0305712 A1 | 10/2016 | Harris | |

FOREIGN PATENT DOCUMENTS

| | | |
|---|---|---|
| CN | 204709869 | 10/2015 |
| CN | 105736717 | 7/2016 |
| CN | 205896210 | 1/2017 |
| CN | 205918994 | 2/2017 |
| CN | 206361241 | 7/2017 |
| EP | 911561 | 4/1999 |
| JP | 11-125344 | 5/1999 |
| JP | 2001033128 | 2/2001 |
| KR | 10-2014-0128769 | 11/2014 |
| WO | 2002/057670 | 7/2002 |
| WO | 2014/178452 | 11/2014 |

* cited by examiner

FLUID SYSTEM COMPONENTS WITH THERMAL CONDITIONING PASSAGES

CROSS-REFERENCE TO RELATED APPLICATION

This application claims priority to and all benefit of U.S. Provisional Patent Application Ser. No. 62/466,757, filed on Mar. 3, 2017, for TRACE FOR FLUID SYSTEM COMPONENT, the entire disclosure of which is fully incorporated herein by reference.

BACKGROUND

Flow control devices, such as valves, manifolds, and regulators, often transmit fluids that are to be maintained at a desired process temperature. Heat tracing or cooling of flow control devices is often required to maintain these desired process temperatures. While many different arrangements may be used for heating or cooling flow control devices and other fluid system components, the use of steam lines or coolant lines is often a cost-effective method. In many applications, however, intimate contact of steam/coolant lines with a flow control device is difficult to achieve, particularly where the device body (e.g., valve body, manifold body block) is relatively bulky (for example, in larger valves designed to withstand higher pressure ratings). Non-uniform heating/cooling of a device body resulting from such difficulties may produce cold spots in a flow control device that can result in freezing, undesirable fluid viscosity, or other such detrimental conditions.

SUMMARY

According to an aspect of the present application, a fluid system component, such as the body of a flow control device, may be produced with one or more internal passages for thermal conditioning, such as, for example, steam tracing or coolant treatment, such that the thermal conditioning fluid may be provided in close proximity to the system fluid passing through the fluid system component.

Accordingly, in an exemplary embodiment of the present application, a flow control device includes a body having a flow passage extending axially along a primary axis between a first end port and a second end port. The flow passage defines a central cavity between the first and second end ports, with an interior surface of the flow passage being defined by an axially extending surrounding side wall of the body. A flow control element is disposed in the central cavity and is movable to control fluid flow between the first end port and the second end port. The body further includes a thermal conditioning passage disposed within the side wall, disconnected from the flow passage, and extending between a first conditioning port and a second conditioning port. The thermal conditioning passage includes a first portion extending circumferentially around at least a portion of the interior surface of the flow passage, a second portion axially spaced from the first portion and extending circumferentially around the portion of the interior surface of the flow passage, and a third portion extending axially between and connecting the first and second portions of the thermal conditioning passage to define a U-shaped bend in the thermal conditioning passage.

In another exemplary embodiment of the present application, a flow control device includes a body having an upper portion defining a flow passage extending axially along a primary axis between a first end port and a second end port, the flow passage defining a central cavity between the first and second end ports, and a lower portion defining an axially extending first thermal conditioning port and an axially extending second thermal conditioning port. A flow control element is disposed in the central cavity and movable to control fluid flow between the first end port and the second end port. The body further includes a thermal conditioning passage having a first vertical portion extending from the first thermal conditioning port into the upper portion of the body, a circumferential portion extending from the first portion circumferentially around at least a portion of the flow passage, and a second vertical portion extending vertically from the circumferential portion to the second thermal conditioning port.

In another exemplary embodiment of the present application, a flow control device includes a body having a flow passage extending axially along a central axis between a first end port and a second end port, the flow passage defining a central cavity between the first and second end ports, with an interior surface of the flow passage being defined by an axially extending surrounding side wall of the body. A flow control element is disposed in the central cavity and movable to control fluid flow between the first end port and the second end port. The body further includes a thermal conditioning passage disposed within the side wall, disconnected from the flow passage, and extending between a first conditioning port and a second conditioning port, the thermal conditioning passage extending radially from the first conditioning port towards the flow passage, to a first branch portion extending circumferentially around a first portion of the interior surface of the flow passage in a first circumferential direction, and a second branch portion extending circumferentially around a second portion of the interior surface of the flow passage in a second circumferential direction opposite the first circumferential direction, the first and second branch portions being in fluid communication with the second conditioning port.

BRIEF DESCRIPTION OF THE DRAWINGS

Further advantages and benefits will become apparent to those skilled in the art after considering the following description and appended claims in conjunction with the accompanying drawings, in which:

DETAILED DESCRIPTION

Figure 1:
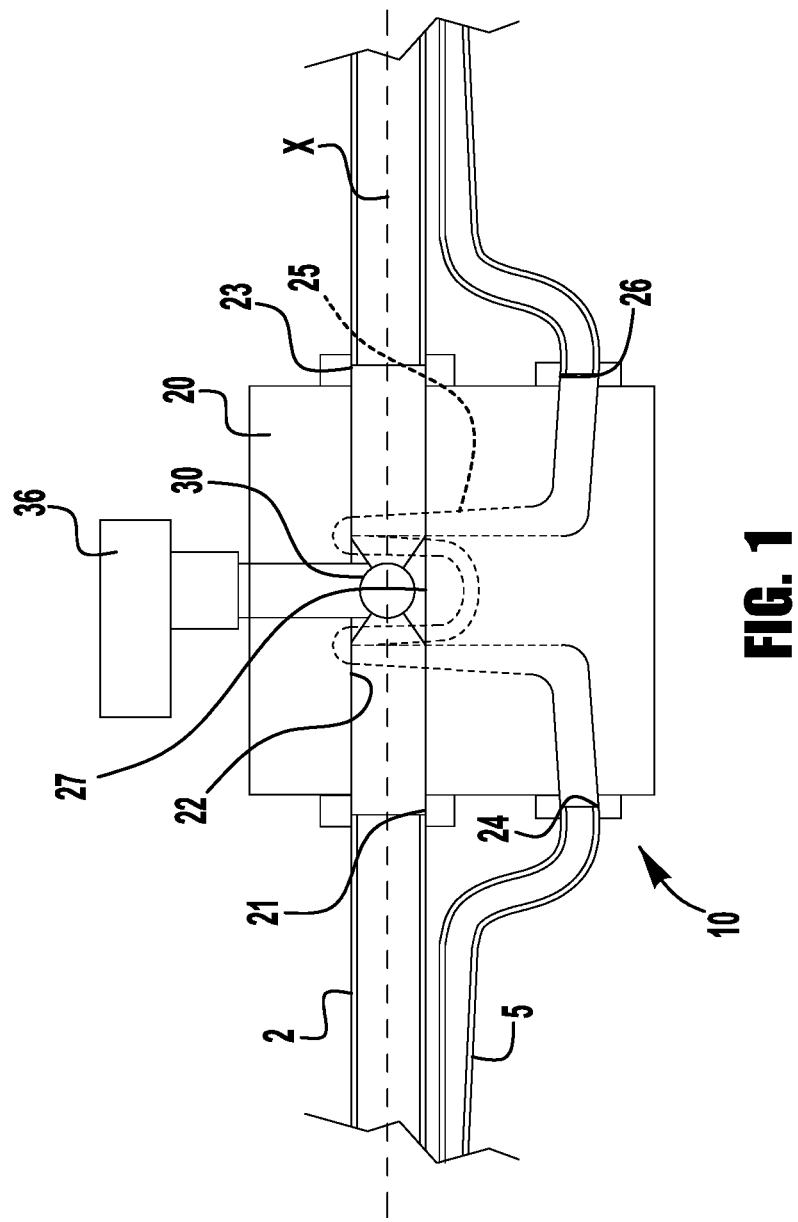
FIG. 1 is a schematic cross-sectional side view of a flow control device having an integrated thermal conditioning passage, according to an exemplary embodiment of the present application.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present application describe ball valves having circumferentially extending thermal conditioning passages integrated into the valve body block, one or more of the features described herein may additionally or alternatively be applied to other types of valves (e.g., other valves, such as plug valves, bellows valves or gate valves), other types of flow control devices (e.g., manifolds, regulators), other types of fluid system components (e.g., fittings, filters, sample cylinders), or other arrangements of thermal conditioning passages (e.g., axial, lateral, or radial extending passages). Additionally, while the geometries and arrangements of many of the thermal conditioning passages described herein are such that their production is facilitated by additive manufacturing, such as 3-D printing, other manufacturing methods may be utilized to provide thermal conditioning passages as described herein, such as, for example, stacked plate assembly, machining, welding, brazing, and casting (e.g., investment casting, sand casting, lost wax casting).

According to an aspect of the present application, the body of a fluid system component (e.g., a valve body) may be provided with a thermal conditioning passage, separate or disconnected from, and in close surrounding proximity to, a system fluid flow passage of the fluid system component, such that a thermal conditioning fluid supplied through the thermal conditioning passage (e.g., steam, coolant) may effectively heat or cool the flow passage and any components within or proximate to the flow passage (e.g., a valve member or other flow control component). This arrangement may provide for more effective thermal conditioning as compared to conventional thermal tracing lines that are wrapped around or secured to an outer surface of a valve or other fluid system component.

FIG. 1 schematically illustrates a flow control device 10 having a body 20 including an integrated thermal conditioning passage 25 that extends proximate to a fluid flow passage 22 to effectively heat or cool the device 10 at the flow passage 22. In the exemplary flow control device 10, the flow passage 22 extends from a first (e.g., inlet) end port 21 to a second (e.g., outlet) end port 23 along a primary axis X, for connection with a process fluid line 2, with a flow control element 30 disposed in a central cavity 27 of the flow passage 22 to control fluid flow (e.g., shutoff, flow regulation) through the flow passage 22. An actuator 36 (e.g., a manually operable handle or pneumatic actuator) is connected with the flow control element 30 and extends from an upper portion of the body 20 for user operation of the flow control device. The thermal conditioning passage 25 extends from a first (e.g., inlet) port 24 to a second (e.g., outlet) port 26, separate or disconnected from the fluid flow passage 22, for connection with a thermal fluid line 5. While the first and second ports 24, 26 of the thermal conditioning passage 25 may be provided in a variety of locations and orientations on the body 20, in one embodiment, the thermal conditioning ports are axially oriented and vertically offset from the flow ports 21, 23, and on opposite ends of the body (e.g., below the flow ports when the flow control device is oriented with the actuator extending upward), for example, to facilitate bundling of the thermal fluid line 5 with the process fluid line 2 upstream and downstream of the device 10. Accordingly, the flow passage 22 and the first and second end ports 21, 23 may be disposed in an upper portion of the body 20, and the first and second conditioning ports 24, 26 may be disposed in a lower portion of the body, opposite the actuator 36. In other embodiments (not shown), the first and second conditioning ports may be laterally, radially, and/or vertically oriented, and/or may be vertically aligned with the fluid flow ports, and/or may be located on the same side of the body.

Figure 2:
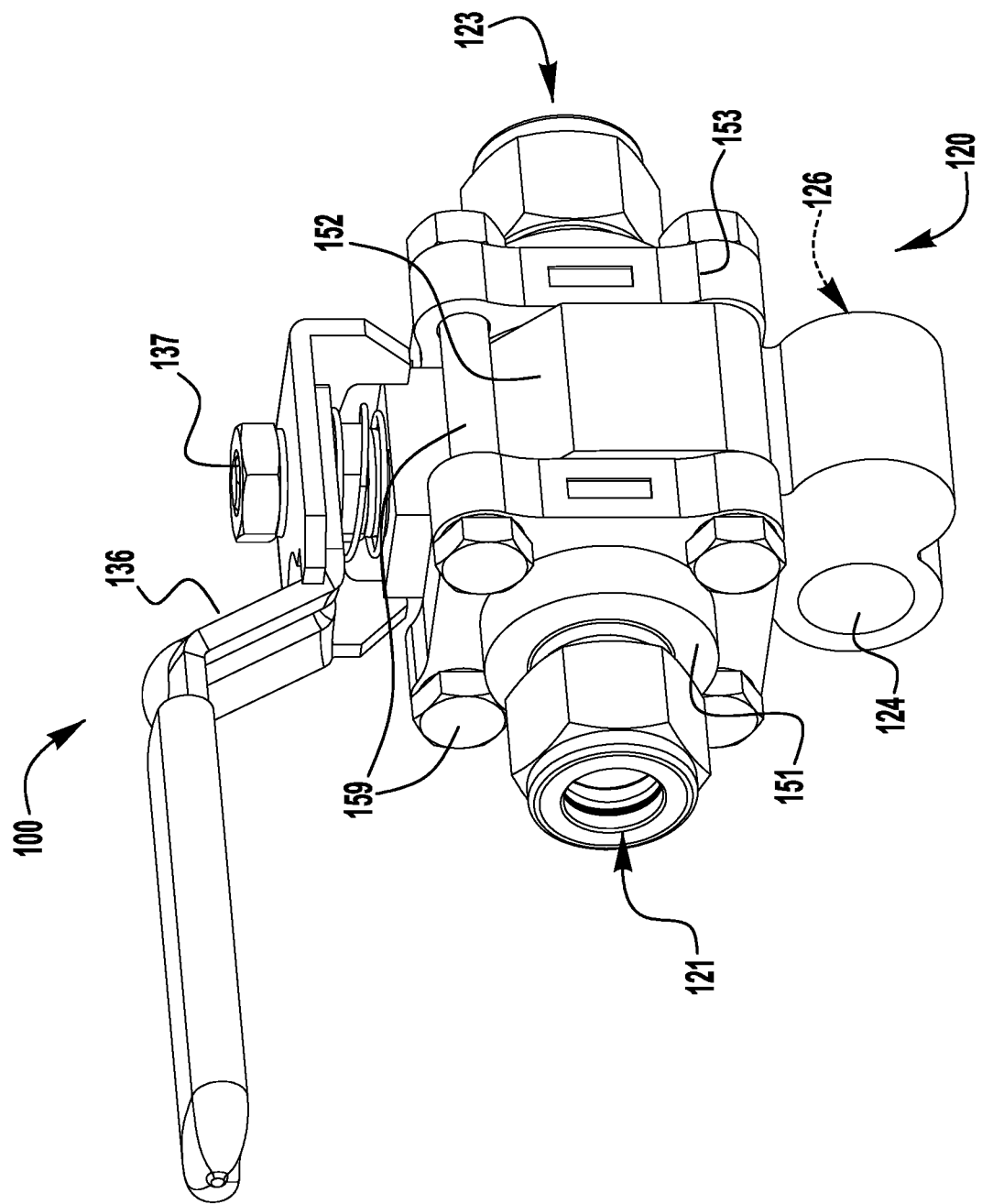
FIG. 2 is a perspective view of a valve having an integrated thermal conditioning passage, according to an exemplary embodiment of the present application.
Figure 3:
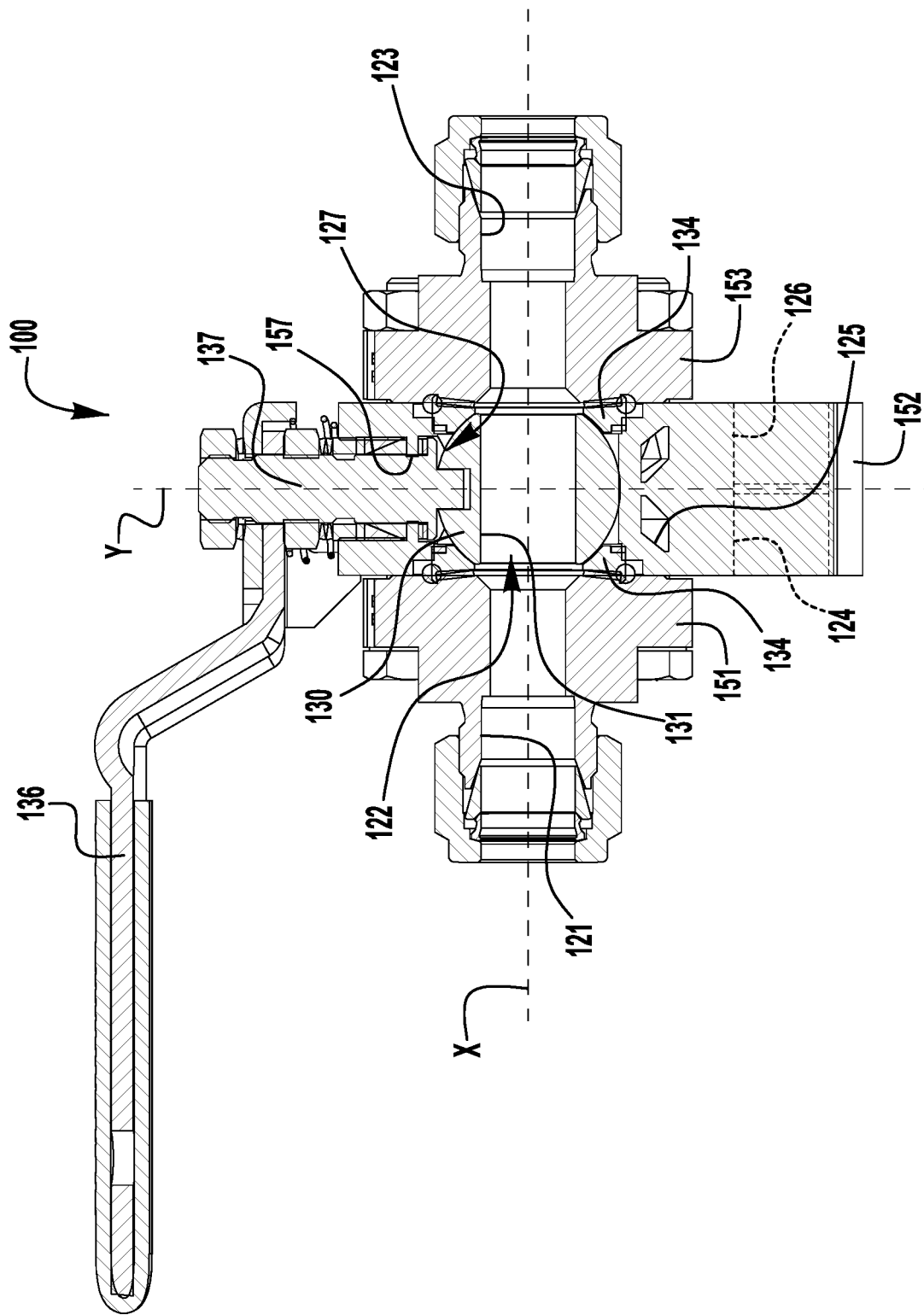
FIG. 3 is a side cross-sectional view of the valve of FIG. 2.
Figure 7:
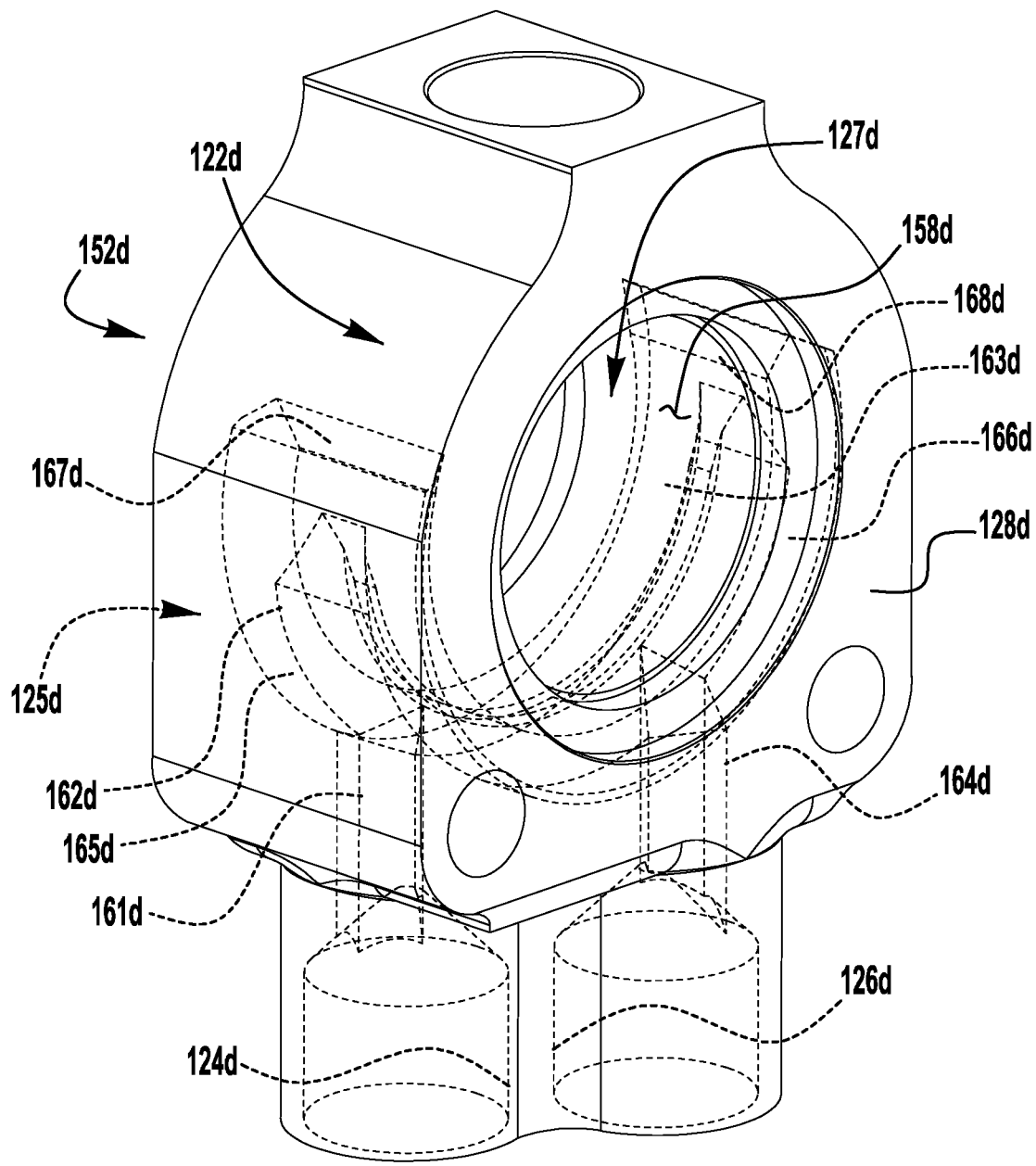
FIG. 7 is a perspective view of another center body block of a valve having an integrated thermal conditioning passage, according to another exemplary embodiment of the present application, shown in phantom to illustrate additional features of the body block.

While the body of a flow control device may be provided in many different suitable constructions, in one embodiment, as shown in FIGS. 2 and 3, a valve 100 includes a valve body 120 formed from a central body block 152 fastened (e.g., by body fasteners 159) between first and second end flanges 151, 153 defining first and second process ports 121, 123 (e.g., tube fitting connections, as shown, or any other suitable connections), with the central body block extending below the end flanges to define a lower portion of the valve body in which axially extending first and second conditioning ports 124, 126 are disposed, vertically offset from the process ports 121, 123 and facing in opposite directions. In other embodiments, the first and second conditioning ports may be laterally, radially, and/or vertically oriented, and/or may be vertically aligned with the fluid flow ports, and/or may be located on the same side of the body (i.e., facing in the same direction). FIG. 7 illustrates an exemplary embodiment of a valve body block 152d having conditioning ports 124d, 126d vertically oriented and extending downward.

As shown in FIG. 3, the central body block 152 includes a flow passage 122 defining a central valve cavity 127 in which a ported ball member 130 is sealed between valve seats 134, and connected with a manually operated handle actuator 136 by a valve stem 137, extending through a stem bore 157 in the body block 152, for rotary actuation of the ball member 130 (e.g., about an axis V substantially perpendicular to the valve axis X). When the actuator 136 is in a closed position, the ball passage 131 is misaligned with the valve seats 134, which seal against the ball member to shut off flow through the valve 100. When the actuator 136 is rotated to an open position, the ball passage 131 aligns with the valve seats 134 to permit flow through the ball member 130 and between the process ports 121, 123. A thermal conditioning passage 125, extending from the first conditioning port 124 to the second conditioning port 126, is disposed entirely within the central body block 152, and extends proximate to the central valve cavity 127 for thermal conditioning (e.g., heating or cooling) of the process fluid and/or the valve components. In other embodiments (not shown), a thermal conditioning passage may additionally or alternatively be disposed in either or both of the end flanges of the valve body. The inclusion of the integral steam/coolant trace passage allows for more intimate positioning of the trace lines with respect to the fluid passage through the valve, and facilitates assembly of such a system (e.g., without requiring welding, insulation, wrapping the valve body with tubing or heating cables, or other labor-intensive procedures common to steam trace installation. Other exemplary benefits include the ability to use NPT steam connections (or other desirable connections) at the bottom of the valve (e.g., one facing each direction), the ability to use with steam-traced tubing bundles, even heating/cooling of valve body; improvement in the ability of the valve to properly operate; extension the life of the valve; reduction in costly, unscheduled repairs and reduced unforeseen shutdowns.

While a thermal conditioning passage may follow any number of contours within a valve body, in some embodiments, it may be desirable to provide thermal conditioning passages, at a location proximate to the process flow path, that extend both axially (i.e., in the direction of fluid flow) and circumferentially (i.e., around the circumference of the flow path), for example, to provide for more uniform thermal conditioning at a critical location in the fluid system, such as across a valve shutoff or regulating component, where extreme thermal conditions may compromise valve performance, and/or where a large pressure drop may result in a significant decrease in temperature (and freezing of system components). The path of the thermal conditioning passage may be configured to maximize effective heating or cooling of the central fluid passage, for example, by selecting a trace passage length and diameter that maintains the heating/coolant fluid in the passage for a duration during which the heating/coolant fluid remains at an effective temperature. In one such example, the trace passage forms a serpentine path, for example, to extend the duration over which the heating/cooling fluid heats/cools the process fluid.

Figure 4:
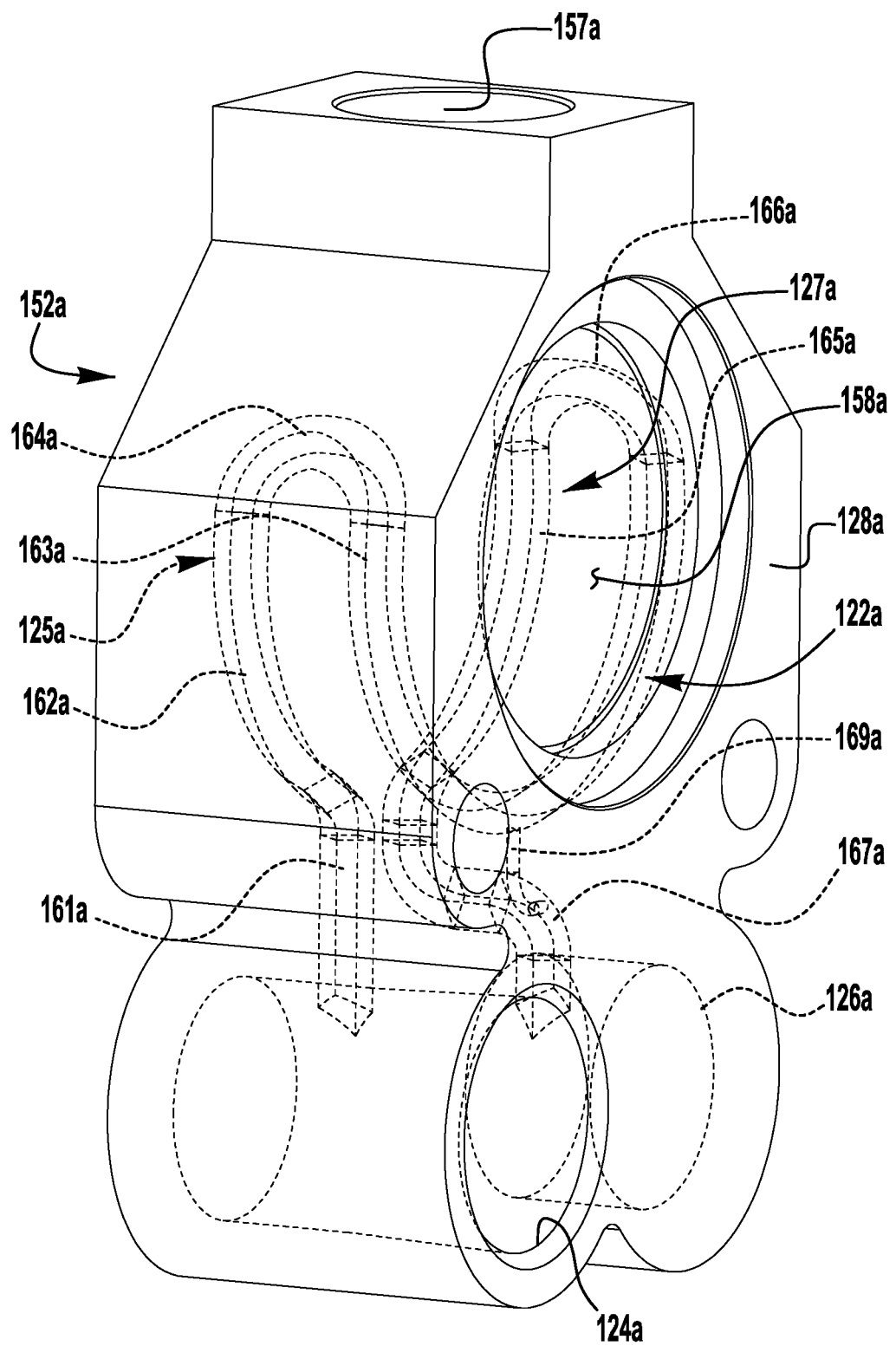
FIG. 4 is a perspective view of a center body block of a valve having an integrated thermal conditioning passage, according to an exemplary embodiment of the present application, shown in phantom to illustrate additional features of the body block.
Figure 4A:
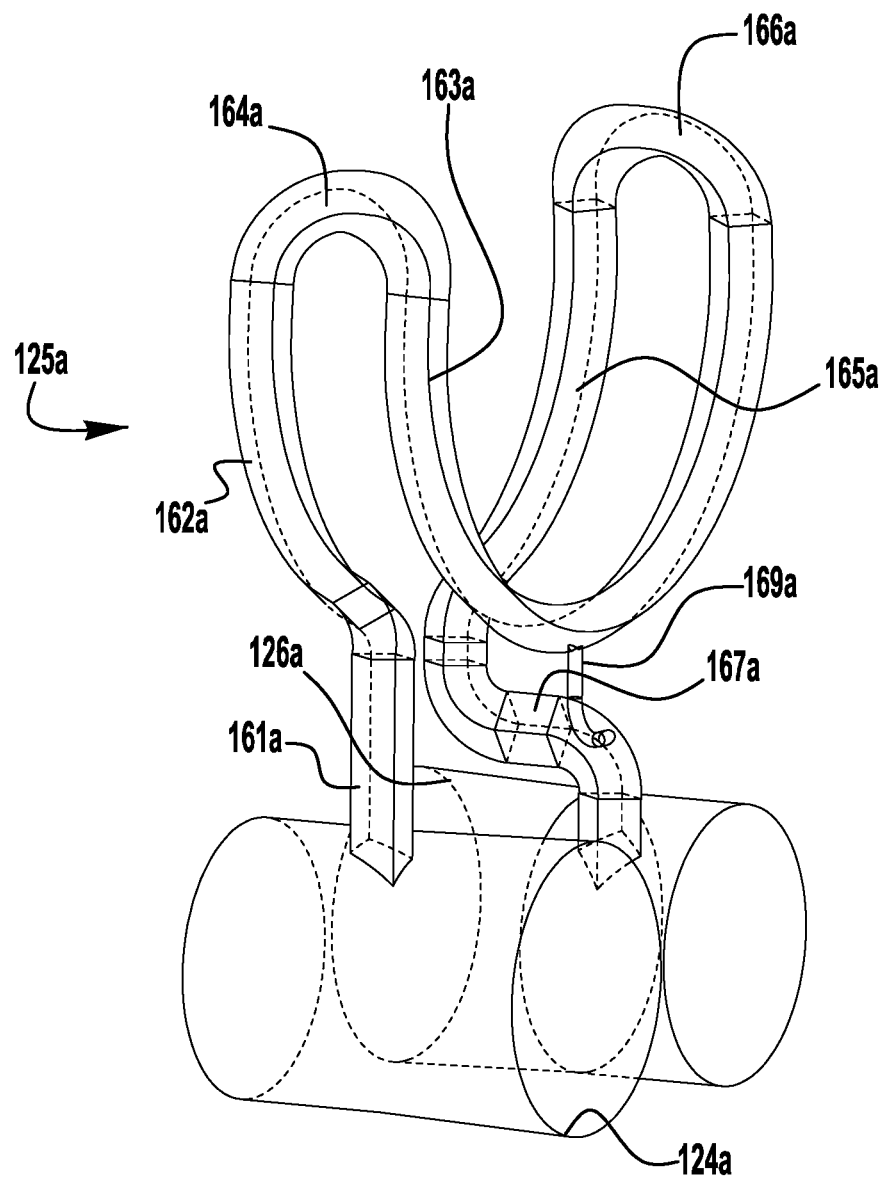
FIG. 4A is a perspective view of the thermal conditioning passage of the body block of FIG. 4.

FIG. 4 illustrates an exemplary central body block 152a for a valve (e.g., the valve of FIGS. 2 and 3), with a process flow passage 122a defining a central valve cavity 127a and having an interior surface 158a defined by an axially extending surrounding side wall 128a of the body block 152a, and a thermal conditioning passage 125a, disconnected from the flow passage 122a, and extending between first and second conditioning ports 121a, 126a (e.g., female NPT threaded ports, or any other suitable connection). In the exemplary embodiment, as more clearly shown in FIG. 4A, the thermal conditioning passage 125a includes a first offset portion 161a extending radially or vertically (as oriented in FIG. 4) from the first conditioning port 124a (in the lower portion of the valve body) to a first circumferential portion 162a (in the upper portion of the valve body), which extends circumferentially around at least a portion of the interior surface 158a of the flow passage 122a, a second circumferential portion 163a axially spaced from the first portion and extending circumferentially around the portion of the interior surface of the flow passage, and a first connecting portion 164a extending axially between and connecting the first and second circumferential portions 162a, 163a of the thermal conditioning passage 125a to define a U-shaped bend in the thermal conditioning passage.

The thermal conditioning passage may include any number of connected circumferentially extending portions. In the exemplary embodiment of FIGS. 4 and 4A, the second circumferential portion 163a extends laterally beyond the offset portion 161a on the opposite lateral side of the body block from the first circumferential portion 162a. A third circumferential portion 165a is axially spaced from the second circumferential portion 163a and extends circumferentially around the portion of the interior surface 158a of the flow passage 122a, and a second connecting portion 166a extending axially between and connecting the second and third circumferential portions 163a, 165a of the thermal conditioning passage 125a to define a second U-shaped bend in the thermal conditioning passage. In the illustrated embodiment, the third circumferential portion 165a is connected with the second conditioning port 126a by a second offset portion 167a extending radially or vertically (as oriented in FIG. 4) from the third circumferential portion to the second conditioning port 126a. To prevent entrapment of fluid in the second circumferential portion 163a, a drain passage 169a may be provided, extending from a bottom portion of the second circumferential portion to the second offset portion 167a.

While the circumferential portions of the conditioning passage may extend around the entire circumference of the flow passage interior surface, in some embodiments, the conditioning passage may not extend to a portion of the flow path circumference, for example, to provide clearance for the valve stem and stem seals. In the illustrated example, the circumferential portions of the conditioning passage 125a extend around lower and side portions of the circumference, with the U-shaped bends being positioned above a center line of the flow passage, such that the thermal conditioning passage extends around at least 180° of a circumference of the flow passage, while providing clearance for the valve stem bore 157a in the body block 152a. In other embodiments (not shown), the thermal conditioning passage may extend proximate to and/or around the valve stem bore, for example, to heat the valve stem area to prevent freezing of the stem packing and resulting actuation difficulties.

While an elongated and convoluted serpentine thermal conditioning passage may provide for effective heat transfer to the process fluid by providing increased surface contact with the conditioning fluid, such a passage may require a greater conditioning fluid pressure (e.g., steam pressure) to account for a greater pressure drop across the conditioning passage. According to another aspect of the present application, a thermal conditioning passage may be provided with branched, circumferential portions, for example, to provide increased conditioning fluid flow and reduced pressure drop while maintaining increased surface contact of the thermal conditioning fluid with the conditioning passage.

Figure 5:
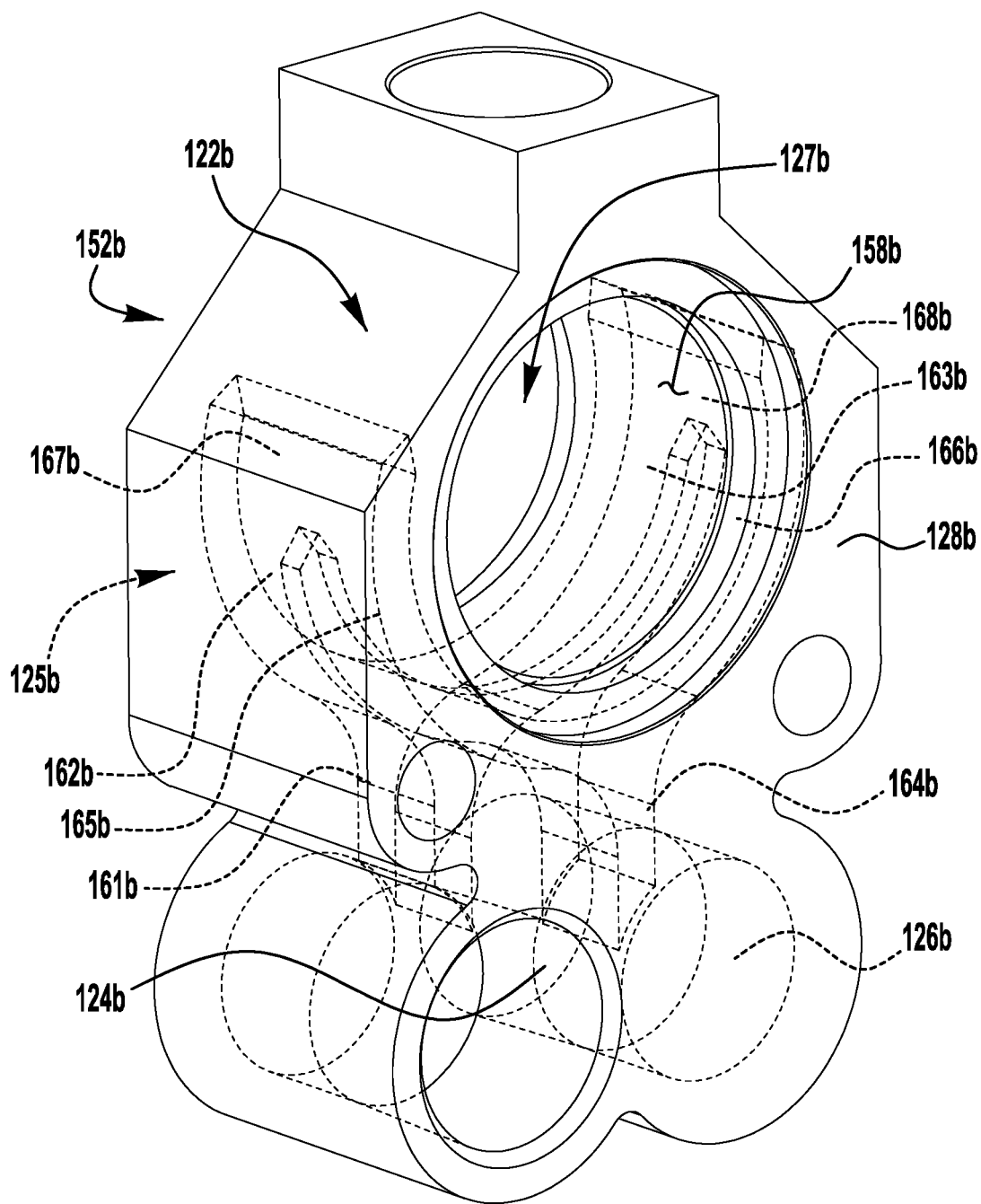
FIG. 5 is a perspective view of another center body block of a valve having an integrated thermal conditioning passage, according to another exemplary embodiment of the present application, shown in phantom to illustrate additional features of the body block.
Figure 5A:
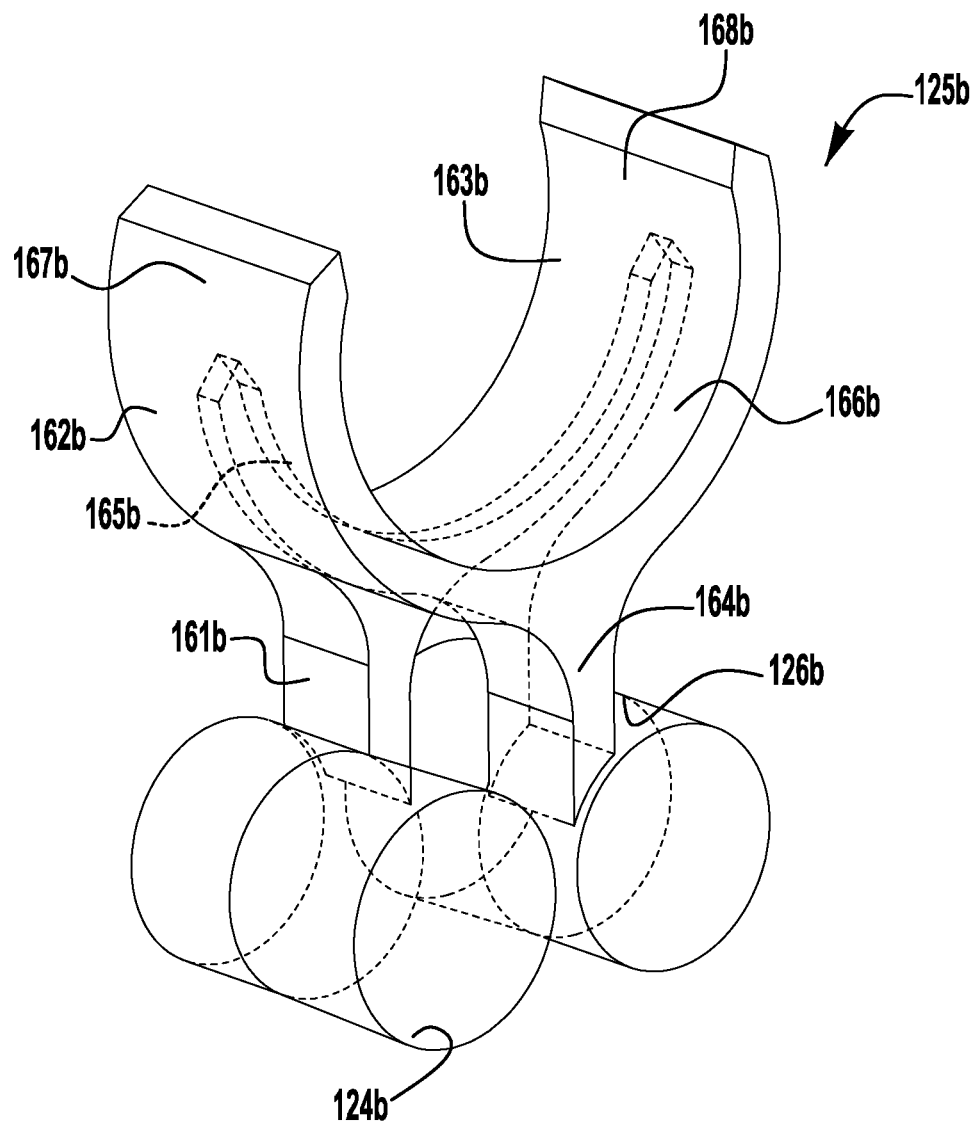
FIG. 5A is a perspective view of the thermal conditioning passage of the body block of FIG. 5.
Figure 6:
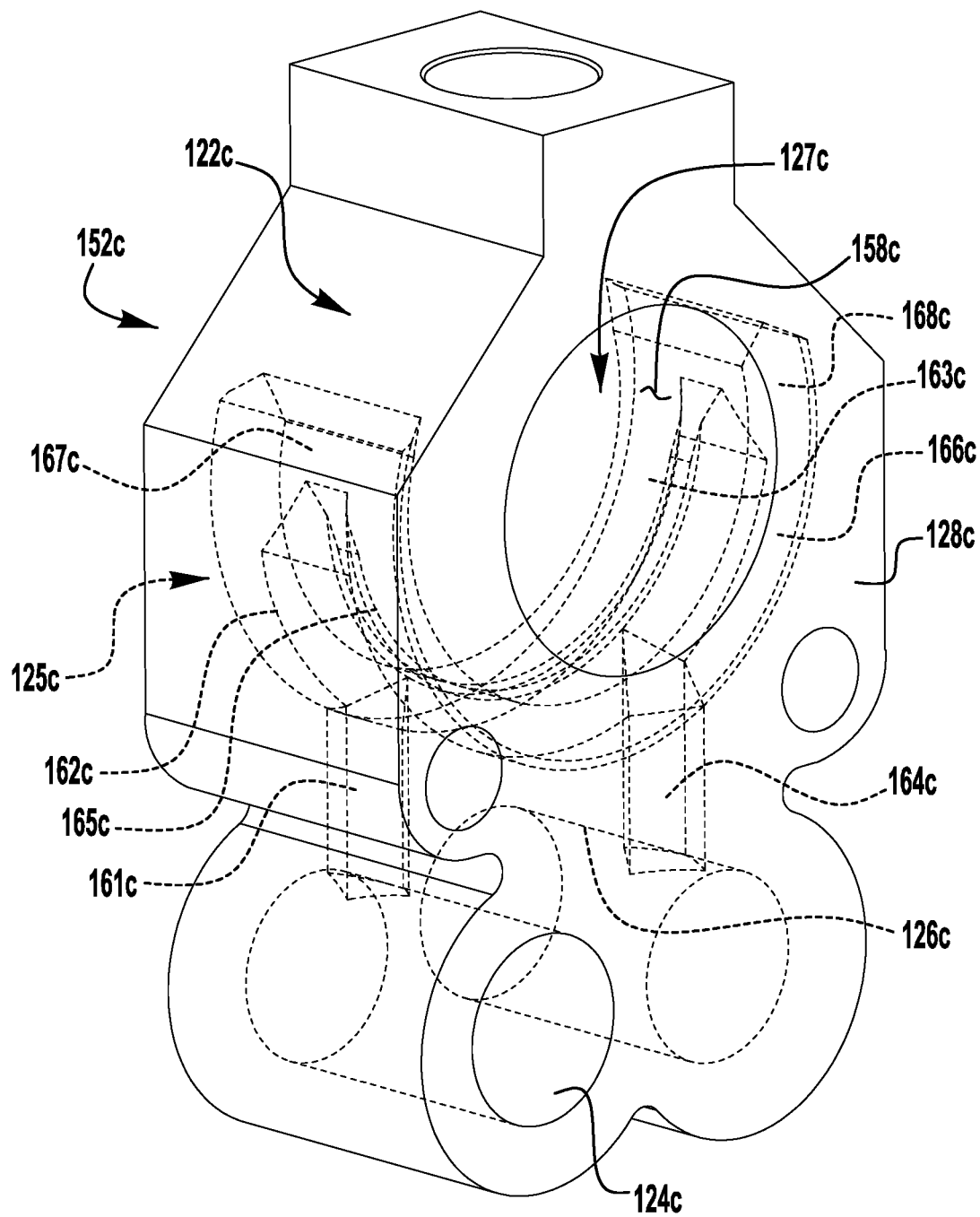
FIG. 6 is a perspective view of another center body block of a valve having an integrated thermal conditioning passage, according to another exemplary embodiment of the present application, shown in phantom to illustrate additional features of the body block.
Figure 6A:
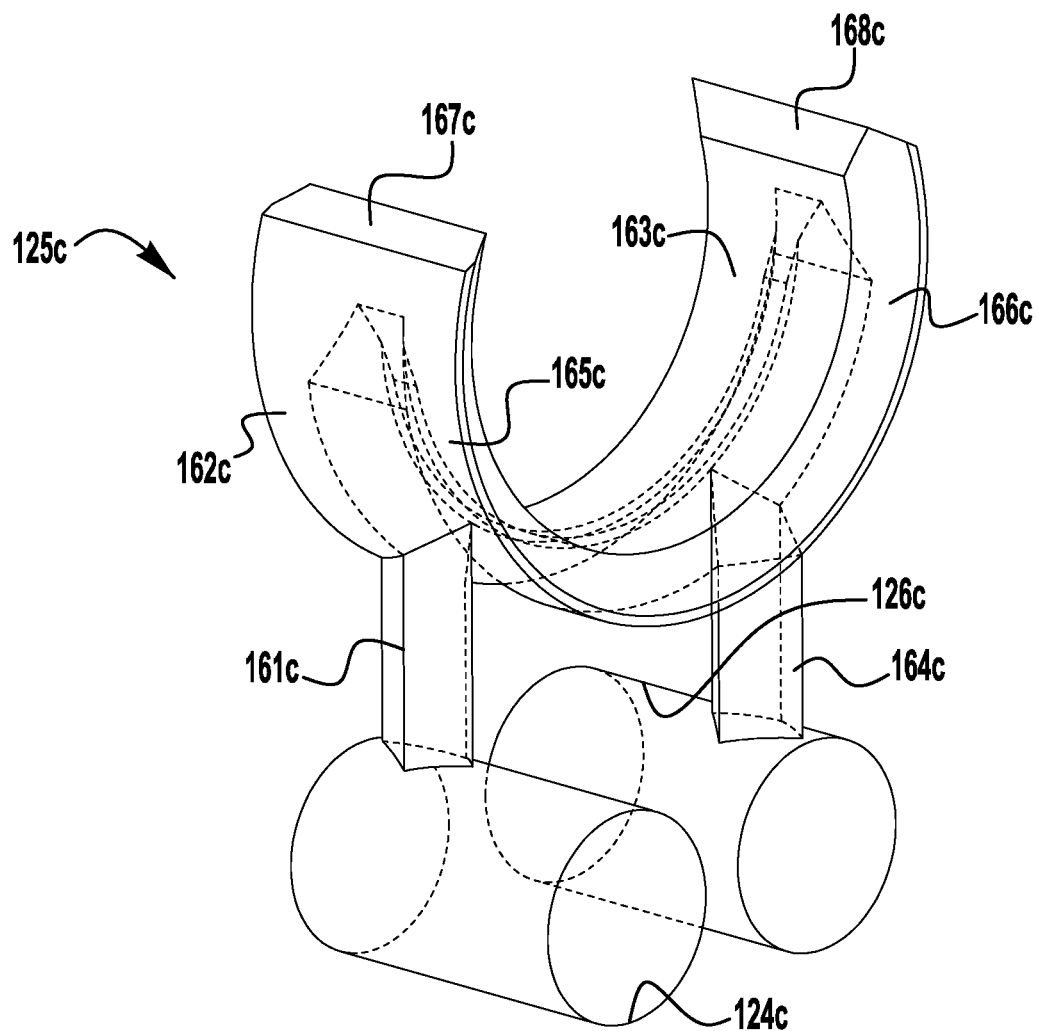
FIG. 6A is a perspective view of the thermal conditioning passage of the body block of FIG. 6.
Figure 7A:
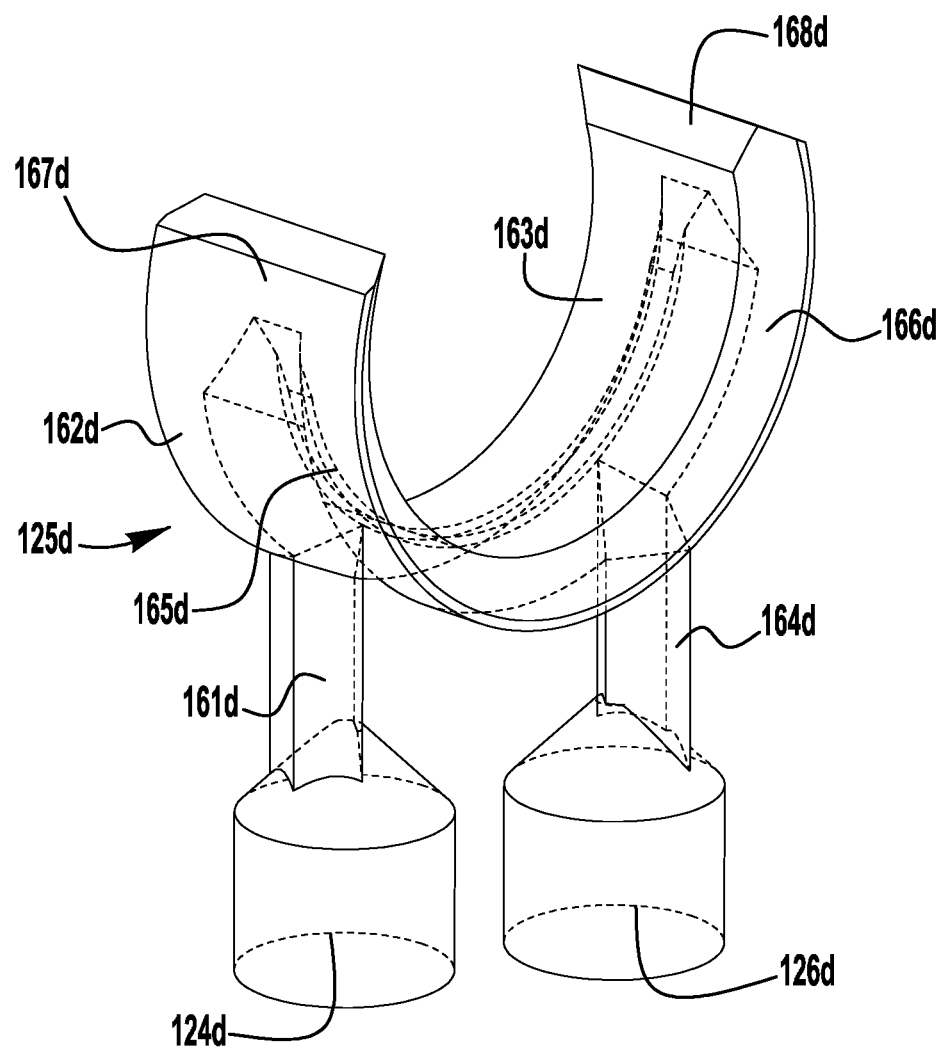
FIG. 7A is a perspective view of the thermal conditioning passage of the body block of FIG. 7.

FIGS. 5, 6, and 7 illustrate exemplary central body blocks 152b, 152c, 152d for a valve (e.g., the valve of FIGS. 2 and 3), with a process flow passage 122b, 122c, 122d defining a central valve cavity 127b, 127c, 127d and having an interior surface 158b, 158c, 158d defined by an axially extending surrounding side wall 128b, 128c, 128d of the body block, and a thermal conditioning passage 125b, 125c, 125d, disconnected from the flow passage, and extending between a first conditioning port 124b, 124c, 124d and a second conditioning port 126b, 126c, 126d. In the exemplary embodiments, as more clearly shown in FIGS. 5A, 6A, and 7A, the thermal conditioning passage includes a first offset portion 161b, 161c, 161d extending radially or vertically (as oriented in the figures) from the first conditioning port 124b, 124c, 124d (in the lower portion of the valve body) to a first circumferential portion 162b, 162c, 162d extending circumferentially around a first portion of the interior surface 158b, 158c, 158d of the flow passage 122b, 122c, 122d in a first circumferential direction, and a second circumferential portion 163b, 163c, 163d extending circumferentially around a second portion of the interior surface of the flow passage in a second circumferential direction opposite the first circumferential direction. In the illustrated embodiments, the thermal conditioning passage 125b, 125c, 125d includes a second offset portion 164b, 164c, 164d extending radially or vertically (as oriented in the figures) from the second conditioning port 126b, 126c, 126d (in the lower portion of the valve body) to a third circumferential portion 165b, 165c, 165d extending circumferentially around the first portion (e.g., parallel to the first circumferential portion 162b, 162c, 162d) of the interior surface 158b, 158c, 158d of the flow passage 122b, 122c, 122d in the first circumferential direction, and a fourth circumferential portion 166b, 166c, 166d extending circumferentially around the second portion (e.g., parallel to the second circumferential portion 163b, 163c, 163d) of the interior surface of the flow passage in the second circumferential direction. A first connecting portion 167b, 167c, 167d extends axially between and connects the first circumferential portion 162b, 162c, 162d and the third circumferential portion 165b, 165c, 165d to define a first U-shaped bend in the thermal conditioning passage, with the first and third circumferential portions forming a first branch in the conditioning passage. A second connecting portion 168b, 168c, 168d extends axially between and connects the second circumferential portion 163b, 163c, 163d and the fourth circumferential portion 166b, 166c, 166d to define a second U-shaped bend in the thermal conditioning passage, with the second and fourth circumferential portions forming a second branch in the conditioning passage 125b, 125c, 125d.

Integrated thermal conditioning paths, as described and shown herein, may be provided with a variety of cross-sectional shapes (e.g., circular, oval-shaped, square, rectangular, diamond shaped, trapezoidal, etc.). According to an aspect of the present application, the cross-sectional shape of the thermal conditioning passage may be selected for increased heat transfer toward the process flow passage by increasing the surface area of the interior surface of the thermal conditioning passage, and/or by increasing the portion of the passage's internal surface that generally faces (e.g., within about 90° of parallel, or within about 60° of parallel, or within about 45° of parallel) the process flow passage. For example, the cross-sectional shape of the conditioning passage may be selected such that the portion of the interior surface that is generally facing the process flow passage is at least about 35%-45%, or about 43%, of the total interior surface of the conditioning passage, or such that the portion of the interior surface that directly faces (i.e., extends parallel with) the process flow passage is about 20%-about 45%. Exemplary oblong cross-sectional passage shapes include trapezoidal, oval-shaped, and diamond-shaped cross sections. In the exemplary embodiment of FIGS. 4 and 4A, the thermal conditioning passage 125a has a diamond-shaped cross section, for which nearly half of the interior surface may generally face the process flow passage. In the exemplary embodiment of FIGS. 5 and 5A, the circumferential portions of the thermal conditioning passage 125b have a substantially rectangular cross-section, with an elongated surface directly facing the process flow passage. In the exemplary embodiments of FIGS. 6, 6A, 7, and 7A, the circumferential portions of thermal conditioning passage 125c, 125d have a parallelogram shape, with a base surface directly facing the process flow passage.

Integral thermal conditioning passages in the body of a flow control device may present manufacturing and/or assembly challenges, particularly for thermal conditioning passages that extend in a curved circumferential path, or that form a U-shaped bend, as shown and described herein. According to an exemplary aspect of the present application, at least a portion of a body (e.g., the central body block of a three-piece valve body, as shown in FIGS. 2-5) may be produced by additive manufacturing to allow for integral thermal conditioning passages of a variety of shapes, contours, sizes and locations, that could not readily be produced using conventional manufacturing methods (e.g., machining, casting, or molding). Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition).

In addition to accommodating different cross-sectional shapes and passage contours, additive manufacturing of the conditioning passage portion of the body of a flow control device may facilitate incorporation of additional features. As one example, portions of the thermal conditioning passage facing the process fluid passage may be layered with a material having a greater thermal conductivity, to facilitate thermal conditioning of the portion of the body surrounding the process fluid passage.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A flow control device comprising:
    a body including a flow passage extending axially along a primary axis between a first end port and a second end port, the flow passage defining a central cavity between the first and second end ports, with an interior surface of the flow passage being defined by an axially extending surrounding side wall of the body; and
    a flow control element disposed in the central cavity and movable to control fluid flow between the first end port and the second end port;
    wherein the body further includes a thermal conditioning passage disposed within the side wall, disconnected from the flow passage, and extending between a first conditioning port and second conditioning port, the thermal conditioning passage comprising:
        a first offset portion extending radially from the first conditioning port towards the flow passage,
        a first branch portion extending directly from the first offset portion circumferentially around a first portion of the interior surface of the flow passage in a first circumferential direction,
        a second branch portion extending directly from the first offset portion circumferentially around a second portion of the interior surface of the flow passage in a second circumferential direction opposite the first circumferential direction,
        a second offset portion extending radially from the second conditioning port towards the flow passage,
        a third branch portion extending directly from the second offset portion circumferentially around the first portion of the interior surface of the flow passage in the first circumferential direction,
        a fourth branch portion extending directly from the second offset portion circumferentially around the second portion of the interior surface of the flow passage in the second circumferential direction,
        a first connecting portion extending axially between end portions of the first and third branch portions, and
        a second connecting portion extending axially between end portions of the second and fourth branch portions.

2. The flow control device of claim 1, wherein the first and second conditioning ports are axially oriented.

3. The flow control device of claim 1, wherein the body includes an upper portion defining the flow passage and the first and second process ports, and a lower portion defining the first and second conditioning ports.

4. The flow control device of claim 1, wherein the flow control element is rotatable about an axis perpendicular to the primary axis.

5. The flow control device of claim 1, wherein the thermal conditioning passage has one of a rectangular cross-section and a diamond-shaped cross-section.

6. The flow control device of claim 1, wherein at least one of the first and second portions of the thermal conditioning passage extends around at least 180° of a circumference of the flow passage.

7. The flow control device of claim 1, wherein the body includes a central body block fastened between first and second end flanges defining the first and second process ports, wherein the thermal conditioning passage is disposed entirely within the central body block.

8. The flow control device of claim 7, wherein the central body block includes an upper portion and a lower portion, wherein the upper portion is aligned with the first and second end flanges and defines the central cavity and the first, second, and third portions of the thermal conditioning passage, and the lower portion extends below the first and second end flanges and defines the first and second conditioning ports.

9. The flow control device of claim 1, wherein the first and second conditioning ports are laterally offset from each other.

10. The flow control device of claim 1, wherein the first and second conditioning ports face in opposite directions.

11. The flow control device of claim 1, wherein at least a portion of the body defining the thermal conditioning passage is produced using additive manufacturing techniques.

12. The flow control device of claim 1, wherein the first connecting portion forms a first U-shaped bend in the thermal conditioning passage, and the second connecting portion forms a second U-shaped bend in the thermal conditioning passage.

13. The flow control device of claim 1, wherein the first and second conditioning ports are vertically oriented.

14. The flow control device of claim 1, wherein the thermal conditioning passage includes a base surface that directly faces and extends parallel with the flow passage.

* * * * *